(12) United States Patent
Galisultanov (10) Patent No.: US 12,066,377 B2
(45) Date of Patent: Aug. 20, 2024

(54) DEVICE FOR EMITTING AND CONTROLLING INFRARED LIGHT AND GAS SENSOR USING SUCH A DEVICE

(71) Applicant: ELICHENS, Grenoble (FR)

(72) Inventor: Ayrat Galisultanov, Grenoble (FR)

(73) Assignee: ELICHENS, Grenoble (FR)

( * ) Notice: Subject to any disclaimer, the term of this patent is extended or adjusted under 35 U.S.C. 154(b) by 267 days.

(21) Appl. No.: 17/613,227

(22) PCT Filed: May 20, 2020

(86) PCT No.: PCT/EP2020/064169
§ 371 (c)(1),
(2) Date: Nov. 22, 2021

(87) PCT Pub. No.: WO2020/234404
PCT Pub. Date: Nov. 26, 2020

(65) Prior Publication Data
US 2022/0214272 A1   Jul. 7, 2022

(30) Foreign Application Priority Data
May 23, 2019   (FR) ..................... 1905426

(51) Int. Cl.
*G01N 21/3504*   (2014.01)
*G01J 3/10*       (2006.01)

(52) U.S. Cl.
CPC .......... *G01N 21/3504* (2013.01); *G01J 3/108* (2013.01); *G01N 2201/061* (2013.01); *G01N 2201/0686* (2013.01)

(58) Field of Classification Search
None
See application file for complete search history.

(56) References Cited

U.S. PATENT DOCUMENTS

| 5,026,992 A | 6/1991 | Wong |
| 5,668,376 A * | 9/1997 | Weckstrom ............. G01J 3/108 |
| | | 250/343 |

(Continued)

FOREIGN PATENT DOCUMENTS

| DE | 102005002208 A1 | 8/2005 |
| EP | 2846201 B1 | 4/2016 |

(Continued)

OTHER PUBLICATIONS

Barritault et al., "Mid-IR source based on a free-standing microhotplate for autonomous CO2 sensing in indoor applications," Sensors and Actuators A, vol. 172 (2011), pp. 379-385.

(Continued)

*Primary Examiner* — David P Porta
*Assistant Examiner* — Carolyn Fin
(74) *Attorney, Agent, or Firm* — TraskBritt (57) ABSTRACT

A device, for emitting and controlling infrared light, comprises a substrate extending between a bottom surface and a top surface. A cavity is provided in the substrate, the cavity opening onto the top surface. A light source extends over the cavity and is able to heat up when passed through by an electric current, so as to emit infrared light. A cover covers the substrate, the cover and the substrate forming a first component enclosing the light source. The light source delineates a first half space comprising the cover, and a second half space comprising the cavity and the bottom surface of the substrate.

14 Claims, 5 Drawing Sheets

(56) References Cited

U.S. PATENT DOCUMENTS

| | | | |
|---|---|---|---|
| 9,851,250 B1* | 12/2017 | Emadi | G01N 21/3504 |
| 2003/0041649 A1 | 3/2003 | George et al. | |
| 2015/0062885 A1 | 3/2015 | Martinez | |
| 2020/0408604 A1* | 12/2020 | Ohta | G01J 5/22 |

FOREIGN PATENT DOCUMENTS

| | | | |
|---|---|---|---|
| EP | 3462149 A1 | 4/2019 | |
| FR | 2866115 A1 | 8/2005 | |
| WO | 2007/064370 A2 | 6/2007 | |
| WO | 2016/162848 A1 | 10/2016 | |
| WO | 2018/229239 A1 | 12/2018 | |

OTHER PUBLICATIONS

International Search Report for International Application No. PCT/EP2020/064169, mailed Jul. 9, 2020, 8 pages (with English Translation).

International Written Opinion for International Application No. PCT/EP2020/064169, mailed Jul. 9, 2020, 11 pages (with English Machine Translation).

Xu "MEMS-based thermoelectric infrared sensors: A review," Review Article, Front. Mech. Eng. 2017, 12(4): 557-566, DOI 10.1007/s11465-017-0441-2.

Lefebvre, "Simulation et conception de microsources infrarouges nanophotoniques pour la détection de gaz" [Simulation and design of nanophotonic infrared microsources for gas detection], Doctoral Thesis, Université Paris-Saclay, presented Dec. 16, 2015.

\* cited by examiner

DEVICE FOR EMITTING AND CONTROLLING INFRARED LIGHT AND GAS SENSOR USING SUCH A DEVICE

CROSS-REFERENCE TO RELATED APPLICATIONS

This application is a national phase entry under 35 U.S.C. § 371 of International Patent Application PCT/EP2020/064169, filed May 20, 2020, designating the United States of America and published as International Patent Publication WO 2020/234404 A1 on Nov. 26, 2020, which claims the benefit under Article 8 of the Patent Cooperation Treaty to French Patent Application Serial No. FR1905426, filed May 23, 2019.

TECHNICAL FIELD

The technical field of the disclosure is an optical gas sensor, and more particularly a nondispersive infrared sensor.

BACKGROUND

It is quite common to use optical methods to analyze a gas. Devices allow the composition of a gas to be determined based on the fact that the species from which a gas is composed have spectral absorption properties that are different from one another. Thus, if an absorption spectral band of a gas species is known, the concentration of the latter may be determined based on an estimation of the absorbance of the light passing through the gas, using the Beer-Lambert law. This principle allows the concentration of a gas species present in the medium to be estimated.

The light source is usually a source emitting in the infrared, the method used usually being designated NDIR detection, NDIR being the acronym of nondispersive infrared. Such a principle has been frequently implemented, and is, for example, described in many documents, for example, in U.S. Pat. No. 5,026,992 or WO2007064370.

In the commonest methods, the analyzed gas lies in an enclosure, between a light source and a photodetector referred to as the measuring photodetector, the latter being intended to measure a light wave transmitted by the gas to be analyzed, and partially absorbed by the latter. These methods generally comprise a measurement of a light wave, referred to as the reference light wave, emitted by the source, and not absorbed by the analyzed gas.

Comparing the light wave in the presence of gas and the light wave without gas allows the gas to be characterized. It is, for example, a question of determining an amount of a gas species in the gas, in the case of the technology referred to as "absorption-based NDIR." It may also be a question of estimating a number of particles in the gas, by detecting light scattered by the latter in a predetermined angular range of scatter.

The reference light wave is measured by a reference photodetector. It may be a question of a reference photodetector different from the measuring photodetector, and arranged so as to be placed facing the light source, or facing a reflector that reflects some of the light emitted by the light source. The reference photodetector is usually associated with a reference optical filter. The reference optical filter defines a reference spectral band, in which the gas to be analyzed exhibits no significant absorption. The advantage of a reference channel is that it allows fluctuations in the light intensity emitted by the light source, for example, as a result of aging of the latter, to be taken into account. The documents WO2016162848 and WO2018229239 describe gas sensors using a measurement channel and a reference channel.

One constraint associated with use of a reference channel is that it is necessary to place two different photodetectors in the enclosure. This sometimes requires different reflectors to be used to reflect the reference light wave toward the reference photodetector, and the measurement light wave toward the measuring photodetector.

Moreover, when the reference light wave propagates through the gas to be analyzed, the reference spectral band is defined so that the absorption of the gas, in the reference spectral band, is minimal, as indicated above. The measuring photodetector detects the light wave attenuated by the gas in a measurement spectral band, corresponding to a spectral band of absorption of a gas species of interest the concentration of which it is desired to estimate. The measurement spectral band is therefore generally different from the reference spectral band. On the basis of the intensity of the reference light wave, if the emission spectrum of the light source is known, a reference light intensity in the measurement spectral band may then be estimated. One limitation of this method is that the emission spectral band of the light source may vary with aging of the source. As a result of this variation, the estimation of the reference light wave, in the measurement spectral band, may be affected by an error.

The disclosure described below allows a simplification of the design of gas sensors.

BRIEF SUMMARY

A first subject of the disclosure is a device for emitting and controlling infrared light, comprising:
 a substrate, extending between a bottom surface and a top surface, a cavity being formed in the substrate, the cavity opening onto the top surface;
 a light source extending over the cavity, able to heat up when passed through by an electric current, so as to emit infrared light;
 a cover, covering the substrate, the cover and the substrate forming a first component enclosing the light source, the first component extending between a bottom end and a top end;
 the light source lying in a plane delineating a first half-space, comprising the cover and the top end of the first component, and a second half-space, comprising the cavity and the bottom end of the first component;
 the device being characterized in that it comprises:
 an infrared-light sensor confined in a second component, the second component extending between a bottom end and a top end;
 the device being such that:
 the second component is securely fastened to the first component;
 the top end of the second component is placed facing the bottom end of the first component;
 such that the light source is arranged to emit a first portion of the light into the first half-space, and through the cover, and a second portion of the light into the second space, and through the substrate, toward the infrared-light sensor, the latter being able to detect an intensity of the light emitted by the light source.

The light source may be formed from a membrane suspended from the substrate and extending over the cavity.

The distance between the top end of the second component and the bottom end of the first component is preferably smaller than 5 mm. The top end of the second component may be placed in contact with the bottom end of the first component.

Preferably:
the light source lies perpendicular to a transverse axis;
the infrared-light sensor lies perpendicular to the transverse axis.

The light source and the infrared-light sensor may notably be centered with respect to the transverse axis.

The light source may comprise an emitting membrane suspended from the substrate and extending over the cavity.

The infrared-light sensor may comprise a detecting membrane: the infrared-light sensor may then be a pyroelectric sensor or a thermopile or a thermistor. The detecting membrane is then preferably substantially parallel to the plane in which the light source lies.

The device may comprise an optical filter placed at the interface between the first component and the second component, the optical filter defining a spectral band of detection of the light propagating toward the infrared-light sensor.

A layer of air or of another gas may lie between the first component and the second component.

A second subject of the disclosure is a gas detector, comprising an enclosure able to be occupied by a gas to be analyzed, the detector comprising:
a light source, configured to emit infrared radiation that propagates through the enclosure;
a measuring photodetector, arranged to capture light emitted by the light source, and having propagated through the gas present in the enclosure, and having been attenuated by the gas as it propagated therethrough;
a reference photodetector, arranged to capture reference light emitted by the light source and considered not to be attenuated by the gas;
the detector being characterized in that it comprises a device for emitting and controlling according to the first subject of the disclosure, such that:
the light source of the device for emitting and controlling forms the light source of the gas detector;
the infrared-light sensor of the device for emitting and controlling forms the reference photodetector of the gas detector.

The device for emitting and controlling and the measuring photodetector are advantageously placed on the same carrier. The carrier may notably bound the enclosure.

According to one embodiment:
the device for emitting and controlling comprises an optical filter, referred to as the reference optical filter, placed between the light source and the light sensor, so as to define a reference spectral band of the light detected by the reference photodetector;
the measuring photodetector is associated with a measurement optical filter, defining a measurement spectral band.

According to one embodiment, the reference spectral band and the measurement spectral band are identical or overlap.

When the device for emitting and controlling comprises an optical filter, defining a detection spectral band, the reference spectral band corresponds to the detection spectral band.

According to one embodiment, the gas detector comprises a processing unit, configured to receive a measurement signal generated by the measuring photodetector and a reference signal generated by the reference photodetector. The processing unit is able to determine whether a gas species is present in the gas, on the basis of the measurement signal and on the basis of the reference signal, the gas species being able to attenuate the light in the measurement spectral band.

A third subject of the disclosure is a gas detector, comprising an enclosure able to be occupied by a gas to be analyzed, the detector comprising:
a light source, configured to emit infrared radiation that propagates to the enclosure, about a propagation axis;
a measuring photodetector, arranged to capture light emitted by the light source, and having propagated through the gas present in the enclosure, and having been attenuated by the gas as it propagated therethrough;
a reference photodetector, arranged to capture reference light emitted by the light source and considered not to be attenuated by the gas;
the detector being characterized in that the light source is placed between the enclosure, or the interior of the enclosure, and the reference photodetector, such that a first portion of the light emitted by the light source propagates to the interior of the enclosure, along the propagation axis, whereas a second portion of the light propagates from the light source to the reference photodetector, in a direction opposite to the first portion of the light.

The gas detector may have the features described with reference to the second subject of the disclosure.

DETAILED DESCRIPTION

Figure 1A:
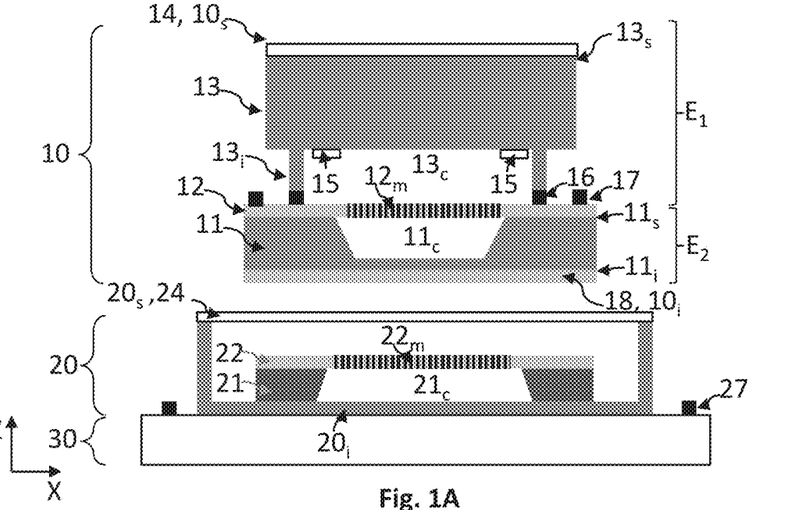
FIG. 1A illustrates three components intended to be assembled to form a device according to the disclosure.

FIG. 1A shows three components 10, 20, 30, assembly of which leads to the obtainment of a device 1 for emitting and controlling according to the disclosure. It is a question of components known to those skilled in the art. Component 30 is optional.

A first component 10 allows infrared light to be emitted. The first component comprises a first substrate 11, in which a cavity $11_c$ has been produced. The first substrate extends between a bottom surface $11_i$ and a top portion $11s$. A thin layer 12 is deposited on the top portion $11s$. The thin layer forms a membrane $12_m$ suspended over the cavity $11c$. Thus, the substrate forms a carrier for the membrane $12_m$.

The membrane $12_m$ is crossed by a conductive track, which is, for example, made of metal. When it is passed through by an electric current, the conductive track heats up, this heating the membrane $12_m$. The temperature of the membrane may then be comprised between 400° C. and 800° C. Under the effect of the heating, the membrane emits infrared radiation. Thus, the membrane $12_m$, which is referred to as the emitting membrane, is configured to emit infrared light. The emitting membrane $12_m$ thus forms a light source. The spectral band of emission of the light is typically comprised between 1 µm and 20 µm. It is generally considered that the emission spectrum of the emitted light follows the spectrum of a black body.

Figure 1B:
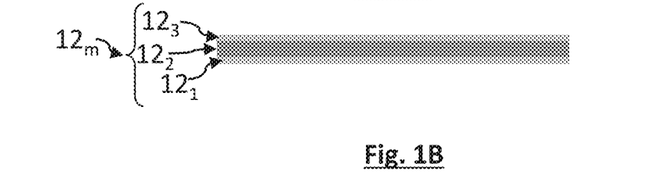
FIG. 1B shows a detail of FIG. 1A.

The emitting membrane $12_m$, for example, consists of an assembly of three layers, as shown in FIG. 1B:
- a first layer $12_1$ of $Si_3N_4$ (SiN) of 100 nm thickness;
- a second layer $12_2$ of $SiO_2$ of 100 nm thickness;
- a third layer $12_3$ of SiN of 100 nm thickness.

Between the first layer $12_1$ and the second layer $12_2$ lies the conductive track, which is, for example, made of gold or platinum. The conductive track is not shown in FIG. 1B.

Parallel to the plane of the substrate 11, the emitting membrane spans a diameter preferably comprised between 100 µm and 1 mm, or between 100 µm and 500 µm. The substrate 11 may comprise one or more semiconductors. It may be a question of an Si substrate or of a silicon-on-insulator substrate.

Such a membrane has already been described, for example, in EP2846201 or in the document Lefebvre A. "*Simulation et conception de microsources infrarouges nanophotoniquespour la détection de gaz*" [Simulation and design of nanophotonic infrared microsources for gas detection], Doctoral Thesis, Universite Paris-Saclay, presented 16 Dec. 2015. It forms a point light source.

A cover 13 is placed on the substrate 11. The cover 13 bounds a chamber $13_c$, around the emitting membrane $12_m$. In the example shown in FIG. 1A, the cover 13 has a bottom portion $13_i$ forming a frame. The frame may be fastened to a joining frame 16 formed on the thin layer 12. The joining frame 16 is, for example, made of gold. The joining frame promotes a seal-tight joint between the substrate 11 and the cover 13.

The device may include a getter material 15, placed in the chamber $13_c$ bounded by the cover 13. The getter material is able to soak up residual gas molecules in the chamber $13_c$. The getter material is known to those skilled in the art. It is a material having chemisorption properties, allowing chemical trapping of gas molecules. The getter material is able to soak up gas via absorption or adsorption. It may, for example, be a question of titanium, Zr, vanadium, chromium, cobalt, Fe, Mn, Pd, Ba, Al, or an alloy thereof. The thickness of the getter material is, for example, comprised between 10 nm and a few µm, 50 nm to 2 µm, for example.

The cover 13 extends between the bottom portion 131 described above, and a top portion $13_s$, which is preferably planar. Advantageously, an anti-reflective layer 14 is placed on the top portion $13_s$ of the cover 13.

An anti-reflective layer 18 may also be placed against the bottom surface $11_i$ of the substrate 11.

The substrate 11 and the cover 13, joined to each another, form the first component 10 containing the emitting membrane $12_m$. The emitting membrane $12_m$ separates two half-spaces:
- a first half-space $E_1$ bounded by the membrane $12_m$, or more precisely by a plane in which the membrane $12_m$ lies, and comprising the cover 13;
- a second half-space $E_2$ bounded by the membrane $12_m$, or more precisely by the plane in which the membrane $12_m$ lies, and comprising the substrate 11.

The first component 10 thus extends between a bottom end $10_i$, which here corresponds to the bottom surface $11i$ of the substrate 11 or to the optional anti-reflective layer 18, and a top end $10s$, which here corresponds to the top portion $13_S$ of the cover or to the optional anti-reflective layer 14.

The infrared light emitted by the emitting membrane is emitted in a solid angle of $4\pi$ steradians. Thus, the emitted light propagates both through the first half-space $E_1$ and the second half-space $E_2$.

The first component 10 also comprises connection pads 17, which are intended to make an electrical interconnection with a circuit board 30 described below.

The device comprises a second component 20. The second component 20 comprises an infrared-light sensor, a thermopile or a pyroelectric sensor, for example. In the example shown in FIGS. 1A to 1E, the infrared-light sensor is a thermopile. The second component 20 comprises a detecting layer 22, which forms the infrared-light sensor, and a central portion of which is formed by a detecting membrane $22_m$. The detecting membrane $22_m$ is, for example, an active portion of a thermopile. Under the effect of an exposure to infrared radiation, a temperature variation occurs within the thermopile. Following this temperature variation, a potential difference appears between the terminals of the thermopile. In the example shown, the second component is a Heimann HCS C2y thermopile.

The detecting membrane $22_m$ is suspended above a cavity $21e$ formed in a carrier 21. The detecting membrane $22_m$ and the carrier 21 are placed in the interior of the second component. The latter extends between a bottom end $20_i$ and a top end $20_s$. An optical filter 24, defining a detection spectral band, may advantageously be placed at the top end $20_s$. In the example shown, the optical filter forms the top end $20_s$ of the second component 20.

The second component 20 is preferably connected, at its bottom end $20i$, to a circuit board 30, a printed circuit board (PCB) 30, for example, on which a printed circuit lies. The printed circuit allows electric power to be supplied to the first component 10 and to the second component 20, the components to be driven, and the signal emitted by the second component 20, which signal is representative of the light detected by the light sensor $22_m$, to be acquired.

An important aspect of the disclosure is that the first component 10 is assembled with the second component 20. More precisely, the bottom end $10_i$ of the first component 10 is close to the top end $20_s$ of the second component 20. In the example shown, an adhesive 19 is placed around the bottom end $10_i$ of the first component 10, so as to form a joint with the top end $20_s$ of the second component. This allows a rigid assembly of the first component 10 and of the second component 20. The first component is not necessarily contiguous with the second component. A free space, of thickness preferably smaller than 5 mm or smaller than 1 mm, may be left between the first component 10 and the second component 20, so as to improve the thermal isolation of the second component 20 with respect to the first component 10, as described in the remainder of the description.

Figure 1C:
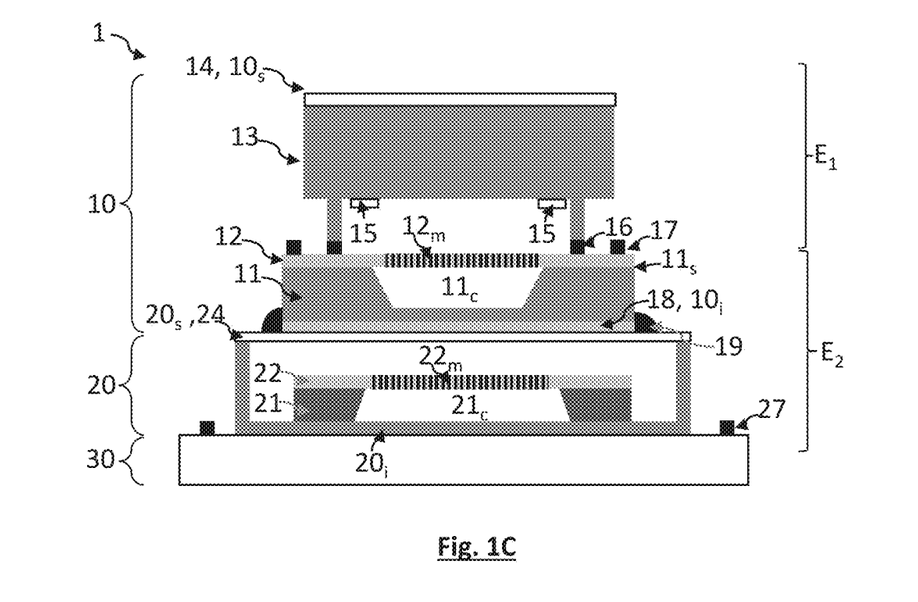
FIG. 1C shows a device according to the disclosure.

This assembly makes it possible to obtain a monolithic device 1 such as shown in FIG. 1C. The device is able to emit light, via the first component 10, and more precisely via the light source formed by the emitting membrane $12_m$. One portion of the emitted light propagates into the first half-space $E_1$, and through the cover 13 and the anti-reflective layer 14. Another portion of the emitted light also propagates into the half-space $E_2$, before being collected by the light sensor formed by the detecting membrane $22_m$ of the second component 20.

Thus, the light sensor, formed by the second component 20, is able to emit a signal the amplitude of which depends on the amount of light emitted by the light source. Such a sensor may be used to control the luminous power of the light radiated by the light source.

Electrical contacts 27 are placed on the circuit board 30. They are intended to be connected to the electrical connection pads 17 placed on the first substrate 11, so as to supply the light source $12_m$ with power.

Figure 1D:
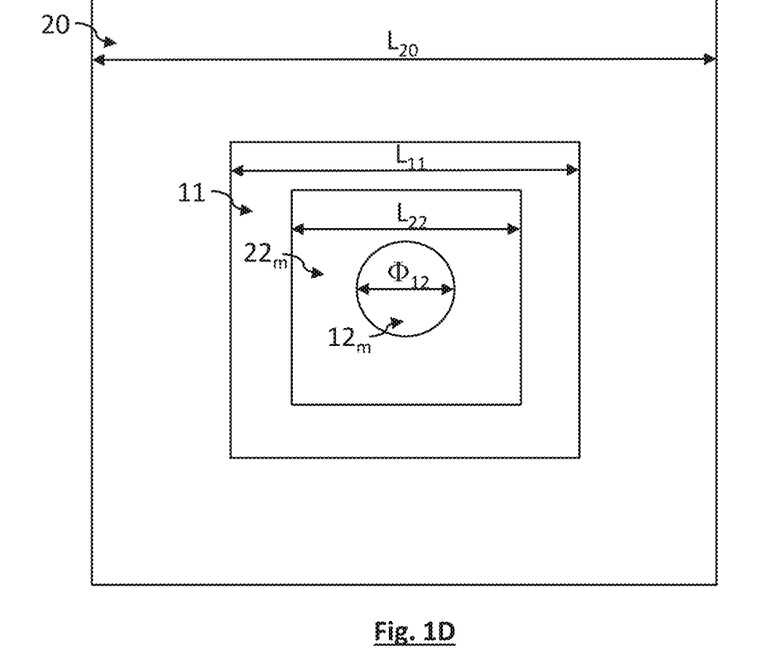
FIG. 1D shows a detail of FIG. 1C. The same is true of FIG. 1E.
Figure 1E:
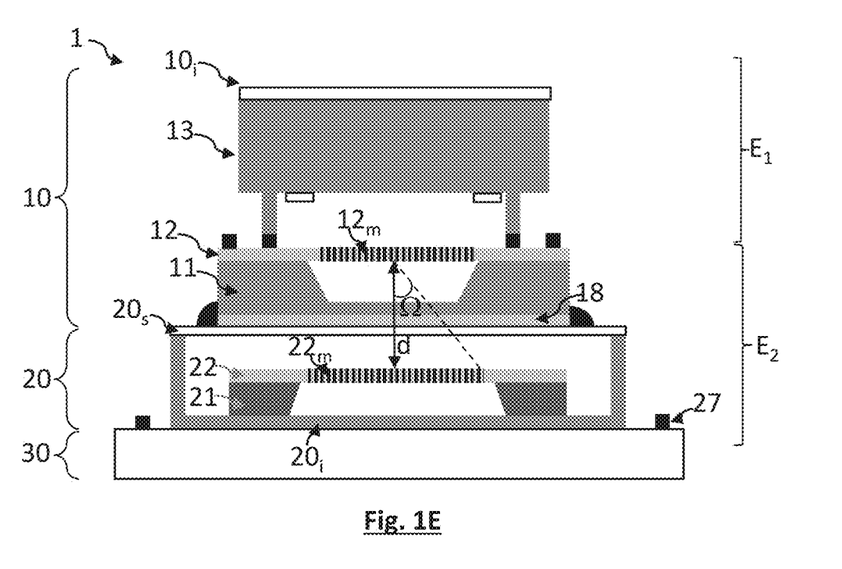

Preferably, the assembly is achieved such that the emitting membrane $12_m$ lies parallel or substantially parallel to the detecting membrane $22_m$. By substantially parallel, what is meant is parallel to within an angular tolerance of a few degrees, for example ±0.5° or ±1° or even ±5°. Preferably, the emitting membrane $12_m$ is centered with respect to the detecting membrane $22_m$, along a transverse axis Z perpendicular to the emitting membrane and/or to the detecting membrane. Such centering is schematically shown in FIG. 1D, perpendicular to the axis Z. In the example shown, the active portion of the emitting membrane $12_m$ spans a diameter $\Phi_{12}$ of 0.3 mm whereas the active portion of the detecting membrane $22_m$ is a square of side-length $L_{22}$ equal to 1.2 mm.

FIG. 1D also shows the respective footprints of the first substrate 11 ($L_{11}$=1.2 mm) and of the second component 20 (square of side-length $L_{20}$=3.8 mm).

The distance d between the emitting membrane $12_m$ and the detecting membrane $22_m$, parallel to the transverse axis Z is, in this example, equal to 1.55 mm. More generally, this distance may be comprised between 500 µm and 3 or 5 mm. The smaller the distance d, the larger the solid angle in which the detecting membrane $22_m$ sees the emitting membrane $12_m$, as may be seen in FIG. 1E. Preferably, the half-angle Ω of the cone extending between the center of the emitting membrane $12_m$ and the periphery of the detecting membrane $22_m$ is larger than or equal to 6° and more preferably larger than or equal to 20°.

Figure 2:
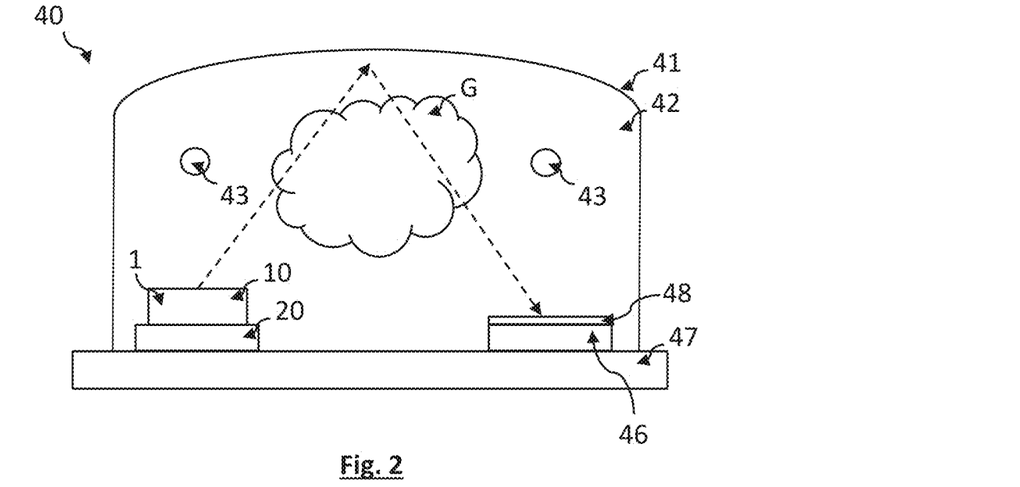
FIG. 2 schematically shows a gas detector comprising a device for emitting and controlling such as described with reference to FIGS. 1A to 1E.

FIG. 2 shows a gas detector 40 employing an emitting device such as described with reference to FIGS. 1A to 1E. As mentioned with reference to the prior art, the gas detector comprises a peripheral wall 41, bounding an enclosure 42. The peripheral wall 41 comprises apertures 43 through which a gas G to be analyzed may be admitted into or evacuate from the enclosure 42. In the example shown, the peripheral wall 41 forms a cover, which is joined to a circuit board 47. The circuit board 47 is, for example, a PCB. In the interior of the enclosure 42, the peripheral wall is reflective in a spectral band comprised between 1 µm and 20 µm.

The gas detector 40 comprises a device 1 for emitting and controlling, such as described above, formed from the first component 10 superposed on the second component 20. Under the effect of a supply of electric power, delivered to the emitting device 1 via the circuit board 47, light is emitted by the first component 10, and more precisely by the emitting membrane $12_m$ confined in the first component 10. Some of the emitted light propagates through the enclosure 42, through the gas to be analyzed. During its propagation through the enclosure 42, the emitted light undergoes an attenuation. The gas detector 40 comprises a photodetector 46, which is referred to as the measuring photodetector, and which is configured to determine an intensity I of the light emitted by the device 1 and attenuated by the gas. Preferably, the measuring photodetector 46 is coupled to an optical filter 48 that defines a measurement spectral band $\Delta\lambda_m$. The measurement spectral band $\Delta\lambda_m$ may notably be defined depending on an absorption spectral band of a predetermined gas species, a concentration of which in the gas G it is desired to measure. Thus, in the measurement spectral band $\Delta\lambda_m$, the gas species, the concentration of which it is desired to determine, is considered to attenuate the light significantly.

The second component 20 allows some of the light emitted by the emitting device 1 to be detected, the detected light propagating from the first component 10 to the second component 20. The second component 20 of the device 1 forms a reference photodetector of the gas detector 40. It allows a reference intensity $I_{ref}$, which is emitted by the light source but not attenuated by the gas to be analyzed, because it does not propagate through the enclosure 42, to be detected. The reference photodetector detects the reference intensity in a reference spectral band $\Delta\lambda_{ref}$.

The gas detector comprises a processing unit 43, which may be placed on the circuit board 47, and which receives the measurement intensity I measured by the measuring photodetector 46 and the reference intensity $I_{ref}$ measured by the device 1, and more precisely by the second component 20 used by way of reference photodetector.

On the basis of the reference intensity $I_{ref}$, it is possible to estimate the intensity $I_0$ that would have reached the photodetector 46, in the measurement spectral band $\Delta\lambda_m$, in the absence of gas in the enclosure. The processing unit may determine an attenuation att of the gas in the measurement spectral band $\Delta\lambda_m$, using the Beer-Lambert law:

$$att = -\ln\left(\frac{I}{I_0}\right) \quad (1)$$

On the basis of the attenuation att, the concentration c of the sought gas species is obtained, using the expression:

$$att = -\mu(c)l \quad (2)$$

µ(c) is an attenuation coefficient, which is dependent on the quantity c sought;

l is the thickness of gas passed through by the light detected in the enclosure.

In contrast to the devices described in the prior art, the gas detector 40 does not have a reference measurement channel for detecting light having propagated through the gas to be measured, in the interior of the enclosure. The reference photodetector corresponds to the light sensor formed by the second component 20 of the device 1 for emitting and controlling. Therefore, it is not necessary to arrange reflective walls in the enclosure, to specifically reflect the light emitted by the light source toward a reference photodetector.

Preferably, the optical filter 24 with which the device 1 for emitting and controlling is equipped defines the same spectral band as the measurement spectral band $\Delta\lambda_m$ of the filter 48. Thus, the gas detector is such that the measurement spectral band $\Delta\lambda_m$ of the measuring photodetector may be identical to the reference spectral band $\Delta\lambda_{ref}$ of the reference photodetector, the latter spectral band corresponding to the detection spectral band of the optical filter 24. This makes it possible to avoid the effect of any distortion of the emission spectrum of the light source during aging, the distortion inducing a relative variation in the intensity emitted by the light source in the reference spectral band and in the measurement spectral band. Specifically, the reference spectral band coinciding with the measurement spectral band, the gas detector is insensitive to a spectral variation in the light source. The measurement spectral band $\Delta\lambda_m$ and the reference spectral band $\Delta\lambda_{ref}$ may also partially overlap. They may also be completely separate from each other.

Another advantage of this configuration is the ease of production of the device 1, the latter being obtained by simply assembling the first component 10 and the second component 20.

Another advantage of this configuration is related to the proximity of the light source $12_m$ and of the infrared-light sensor $22_m$: This allows a high quantity of signal to be detected by the infrared-light sensor.

More generally, the disclosure relates to a gas detector, comprising an enclosure, a light source and a measuring photodetector, the latter being configured to detect light having propagated through the gas to be analyzed, which is present in the enclosure. The light source is configured to emit, about an emission axis, a first portion of the light toward the interior of the enclosure. The light source is associated with a reference photodetector, such that the light source is placed between the enclosure and the reference photodetector. A second portion of the light thus propagates toward the reference photodetector, about the emission axis, but in a direction opposite to the direction of propagation of the first portion of the light. The second portion of the light thus reaches the reference photodetector without having propagated through the enclosure. The light source and the reference photodetector may have features such as those described above. Furthermore, use of other superposed light source/photodetector configurations are envisionable, provided that the reference photodetector is superposed on the light source, and that it is able to detect some of the light emitted by the latter, the rest propagating from the light source to the enclosure containing the gas to be analyzed.

Figure 3A:
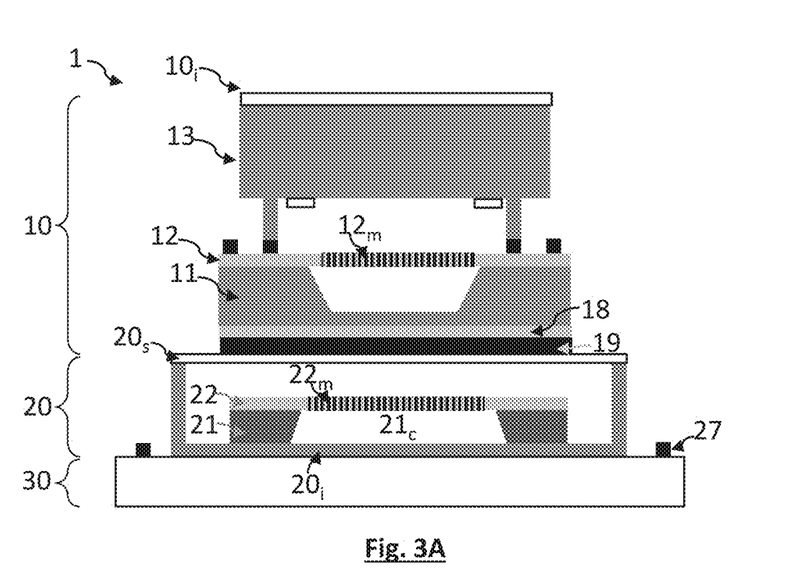
FIGS. 3A, 3B, 3C and 3D schematically show embodiments of the disclosure.
Figure 3B:
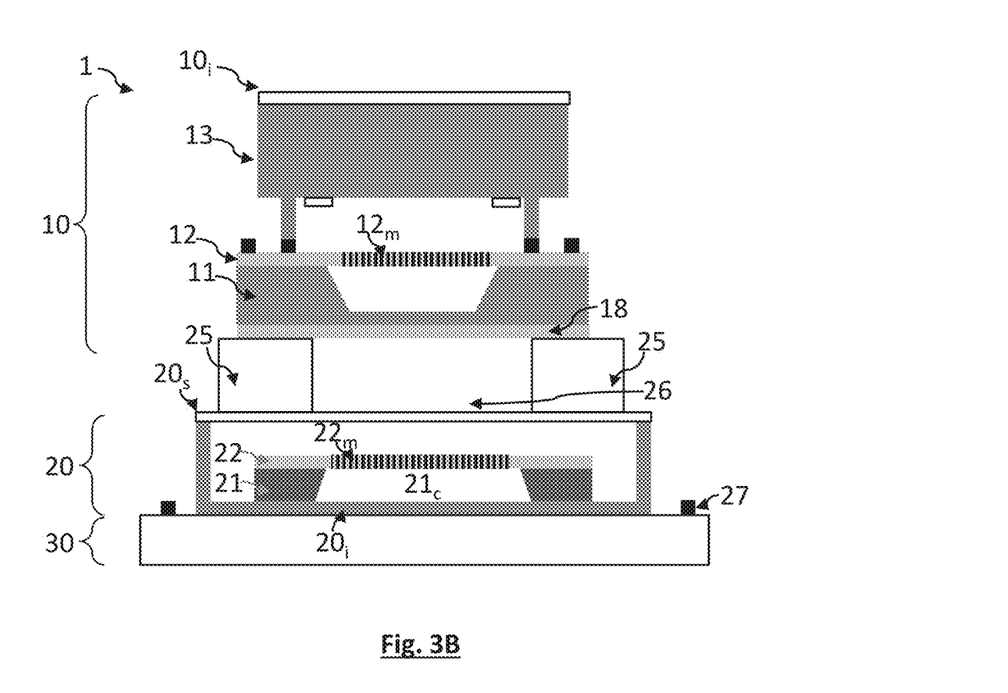

FIGS. 3A and 3B show other embodiments of the disclosure. In FIG. 3A, the first component 10 is joined to the second component 20 by a small thickness of adhesive 19 extending between the bottom end $10_i$ of the first component 10 and the top end $20_s$ of the second component 20.

As previously mentioned, it may be preferable to leave a free space between the first component 10 and the second component 20, so as to reinforce the thermal isolation of the second component 20 with respect to the first component 10. The free space is intended to be filled with air or gas, the gas to be analyzed for example. Specifically, during its use, the light source, formed by heating the emitting membrane $12_m$, heats up. The cavity Ic lying around the emitting membrane $12_m$ is generally kept under a vacuum produced via removal of air. However, some of the heat diffuses through the first component 10, to the second component 20. Some of the heat having diffused from the first component 10 may thus be transmitted to the detecting membrane $22_m$. However, it is necessary to prevent the detecting membrane $22_m$ from being subject to parasitic heating, i.e., heating other than that corresponding to the infrared radiation emitted by the light source. Specifically, parasitic heating forms a parasitic component of the detection signal, which gets superposed on a useful component corresponding to the detected infrared radiation. It is then necessary to extract the useful component from the signal output from the light sensor, and this may be tricky.

A layer 26 of thermal insulation, for example a layer of air, or of another gas, or even of vacuum, may therefore be provided, between the first component 10 and the second component 20, in order to limit heating of the second component 20 by the first component 10.

In the embodiment shown in FIG. 3B, an intermediate thermally insulating element 25 has been interposed between the first component 10 and the second component 20. The intermediate thermally insulating element forms a structure, which preferably comprises a thermally insulating material. The intermediate thermally insulating element makes it possible to trap a layer 26 of air (or of another gas, or of vacuum) between the first component 10 and the second component 20.

Whatever the embodiment, so as to limit parasitic heating of the membrane $22_m$ via thermal conduction, the cavity $21_c$ provided in the second component 20 may be placed under vacuum, and comprise a getter material, such as described with reference to FIG. 1A. The second component 20 may, for example, comprise a thermal radiation detector, for example a pyroelectric sensor or a thermopile or a thermistor.

Figure 3C:
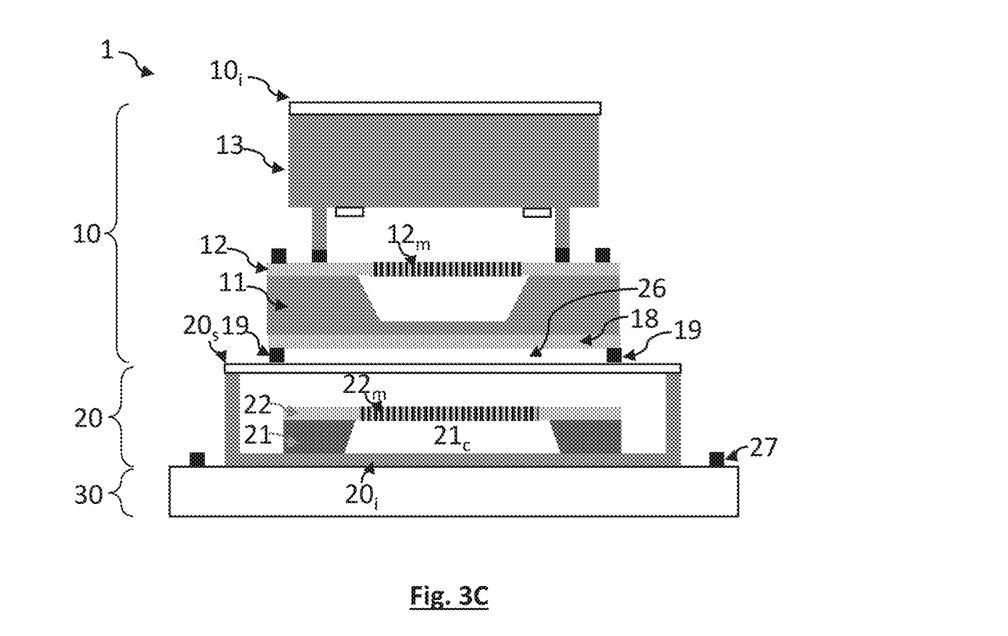
Figure 3D:
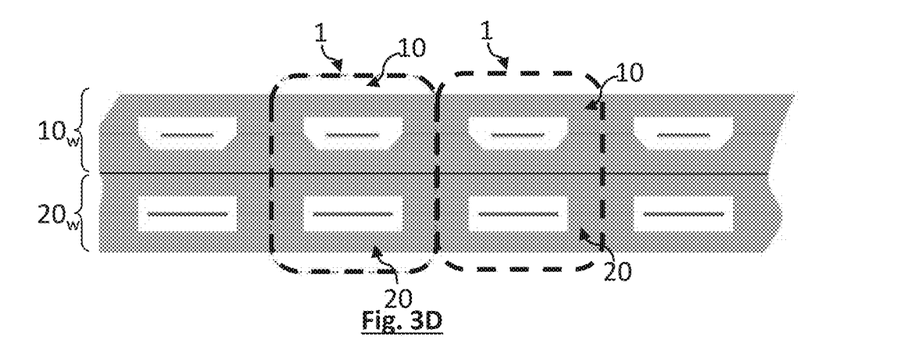

Another example is given in FIG. 3C, the first component 10 being sealed to the second component 20, for example by the adhesive 19 or by direct sealing. Such a device may be obtained through wafer level packaging, as illustrated in FIG. 3D. FIG. 3D shows an example in which a first wafer $10_w$ in which a plurality of first components 10 have been produced is provided. A second wafer $20_w$ in which a plurality of second components 20 have been produced is provided. Assembling the first wafer $10_w$ on the second wafer $20_w$ allows a plurality of devices 1 to be obtained. The latter are separated from one another following the assembly of the two wafers.

The configuration described with reference to FIGS. 1A to 1E has been tested. The conductive track formed in the emitting membrane $12_m$ was subjected to a potential difference $V_{12}$, forming square-wave pulses with a duration of 1.5 s.

Figure 4A:
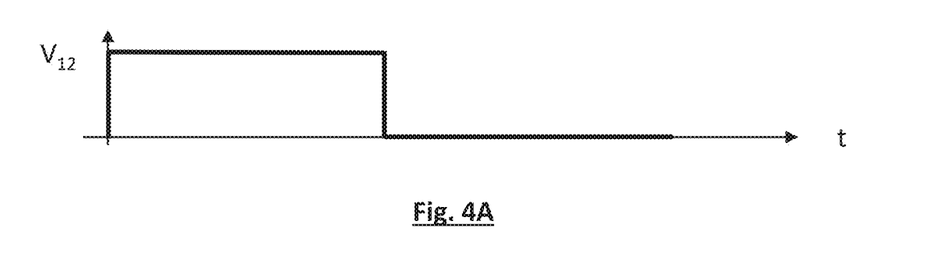
FIG. 4A shows the shape of the pulses that supplied power to the light source of the device during experimental trials.
Figure 4B:
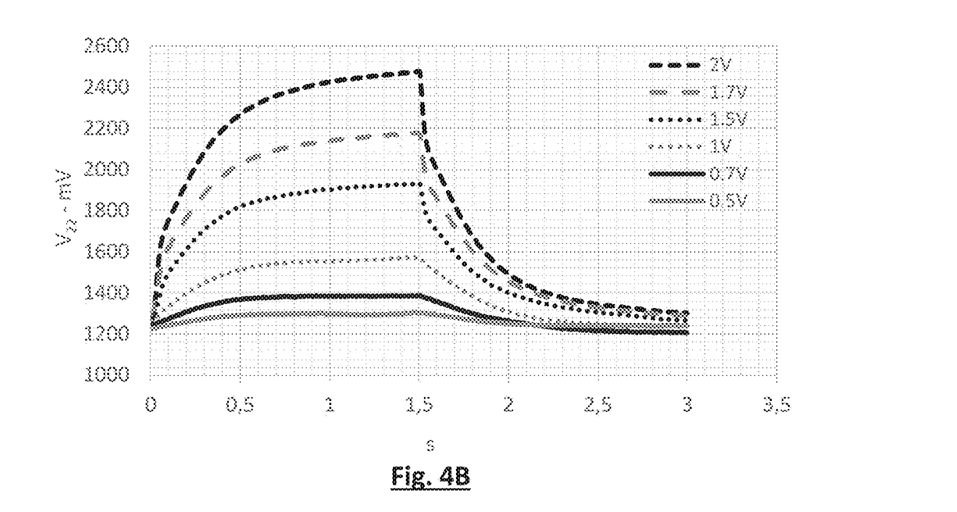
FIG. 4B shows the signals detected by the light sensor of the device for various supply voltages of the light source.

FIG. 4A schematically shows the shape of the pulses supplying power to the emitting membrane $12_m$. A voltage $V_{22}$ of a detection signal generated across the terminals of the circuit board 30, which signal was representative of an amount of light detected by the detecting membrane $22_m$, was then measured. The measured voltage formed a response of the second component 20 to the illumination originating from the first component 10. FIG. 4B shows various responses measured for various values of the potential difference $V_{12}$. In FIG. 4B, the y-axis corresponds to a measured voltage $V_{22}$, whereas the x-axis represents time.

The disclosure may be implemented on gas sensors for industrial or domestic use, or in applications related to monitoring atmospheric pollution.

The invention claimed is:
1. A device for emitting infrared light, comprising:
a substrate, comprising a bottom surface and a top surface, the substrate extending between the bottom surface and the top surface, a first cavity being formed in the substrate, the first cavity opening onto the top surface;
a light source extending over the first cavity, the light source being configured to heat up when passed through by an electric current, so as to emit infrared light;
a cover, covering the substrate, the cover and the substrate forming a first component enclosing the light source, the first component comprising a first bottom end and a first top end, the first component extending between the first bottom end and the first top end;
the light source lying in a plane delineating:
• a first half-space, comprising the cover and the first top end of the first component;
• and a second half-space, comprising the first cavity and the first bottom end of the first component;
wherein the device further comprises:
an infrared-light sensor, confined in a second component, the second component comprising a second bottom end and a second top end, the second component extending between the second bottom end and the second top end;
and wherein:

the infrared-light sensor comprises a detecting membrane, the infrared-light sensor forming a thermal radiation detector;

the detecting membrane lies in a second cavity that is placed under vacuum, and that forms part of the second component, the second component is securely fastened to the first component;

the second top end of the second component is placed facing the first bottom end of the first component;

such that the light source is arranged to emit:
- a first portion of the light into the first half-space, and through the cover;
- and a second portion of the light into the second space, and through the substrate, toward the infrared-light sensor, the latter being configured to control an intensity of the light emitted by the light source.

2. The device according to claim 1, wherein the light source is a membrane that is suspended from the substrate, and that extends over the first cavity.

3. The device according to claim 1, wherein the distance between the second top end of the second component and the first bottom end of the first component is smaller than 5 mm.

4. The device according to claim 1, wherein:
the light source lies perpendicular to a transverse axis;
the infrared-light sensor lies perpendicular to the transverse axis.

5. The device according to claim 4, wherein the light source and the infrared-light sensor are centered with respect to the transverse axis.

6. The device according to claim 1, wherein the detecting membrane is parallel or substantially parallel to the plane in which the light source lies.

7. The device according to claim 1, comprising an optical filter, placed at the interface between the first component and the second component, the optical filter defining a spectral detection band of the light propagating toward the infrared-light sensor.

8. The device according to claim 1, wherein a layer of air or of another gas lies between the first component and the second component.

9. A gas detector, comprising an enclosure, configured to be occupied by a gas to be analysed, the gas detector comprising:

a gas detector light source, configured to emit infrared radiation that propagates through the enclosure;

a measuring photodetector, configured to capture the light emitted by the gas detector light source, and having propagated through the gas present in the enclosure, and having been attenuated by said gas as it propagated therethrough;

a reference photodetector, configured to capture reference light emitted by the gas detector light source and considered not to be attenuated by the gas;

the gas detector further comprising the device according to claim 1;

such that:
the light source of the device forms the gas detector light source;
the infrared-light sensor of the device forms the reference photodetector of the gas detector.

10. The gas detector according to claim 9, wherein the device and the measuring photodetector are placed on a same carrier.

11. The gas detector according to claim 10, wherein the carrier bounds the enclosure.

12. The gas detector according to claim 9, wherein:
the device comprises a reference optical filter, placed between the light source and the infrared-light sensor, so as to define a reference spectral band of the light detected by the reference photodetector;
the measuring photodetector is associated with a measurement optical filter, defining a measurement spectral band.

13. The gas detector according to claim 12, wherein the reference spectral band and the measurement spectral band are identical or overlap.

14. The gas detector according to claim 9, comprising a processing unit, configured to receive a measurement signal generated by the measuring photodetector and a reference signal generated by the reference photodetector, and to determine an amount of a gas species present in the gas, on the basis of the measurement signal and on the basis of the reference signal, the gas species being able to attenuate the light in the measurement spectral band.

* * * * *

UNITED STATES PATENT AND TRADEMARK OFFICE
CERTIFICATE OF CORRECTION

| | | |
|---|---|---|
| PATENT NO. | : 12,066,377 B2 | |
| APPLICATION NO. | : 17/613227 | |
| DATED | : August 20, 2024 | |
| INVENTOR(S) | : Ayrat Galisultanov | |

It is certified that error appears in the above-identified patent and that said Letters Patent is hereby corrected as shown below:

On the Title Page

| | | |
|---|---|---|
| Item (57), | Line 11, | change "a first half space comprising" to --a first half-space, comprising-- |
| Item (57), | Line 12, | change "second half space comprising" to --second half-space, comprising-- |

In the Specification

| | | |
|---|---|---|
| Column 5, | Line 25, | change "Thesis, Universite Paris-Saclay," to --Thesis, Université Paris-Saclay,-- |
| Column 5, | Line 30, | change "portion 13; forming" to --portion 13$_i$ forming-- |
| Column 5, | Lines 47-48, | change "portion 131 described" to --portion 13$_i$ described-- |
| Column 6, | Lines 22-23, | change "a cavity 21$e$ formed" to --a cavity 21$_c$ formed-- |
| Column 8, | Line 28, | change "attenuation *all*, the" to --attenuation *att*, the-- |
| Column 9, | Line 39, | change "The cavity Ic lying" to --The cavity 11$_c$ lying-- |

Signed and Sealed this
Twenty-sixth Day of November, 2024

Katherine Kelly Vidal
*Director of the United States Patent and Trademark Office*